(No Model.)
B. WOLHAUPTER.
RAILWAY TIE PLATE.
No. 579,509. Patented Mar. 23, 1897.
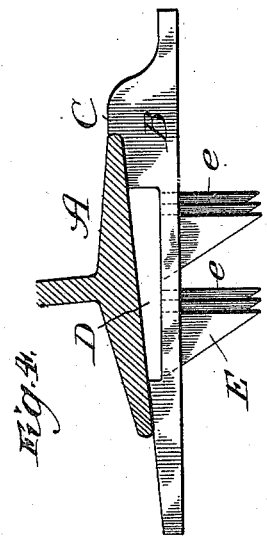
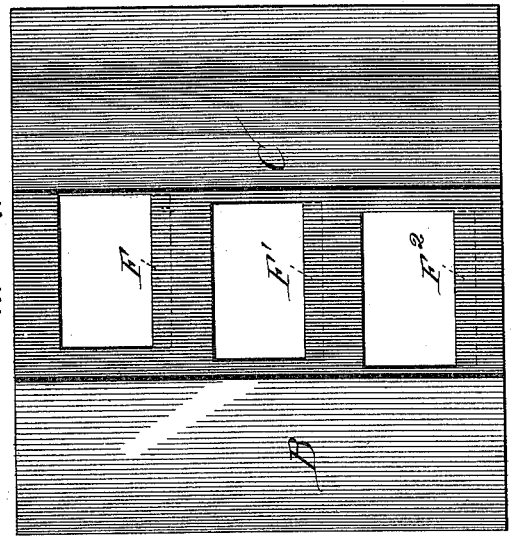
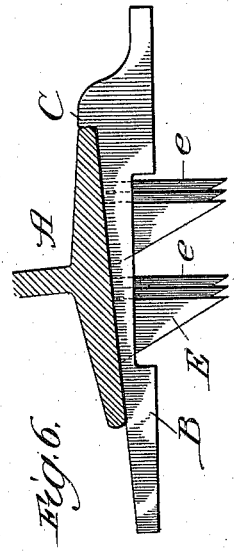
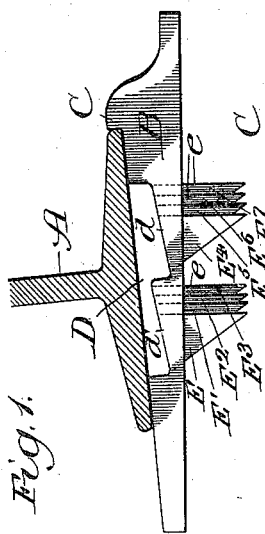
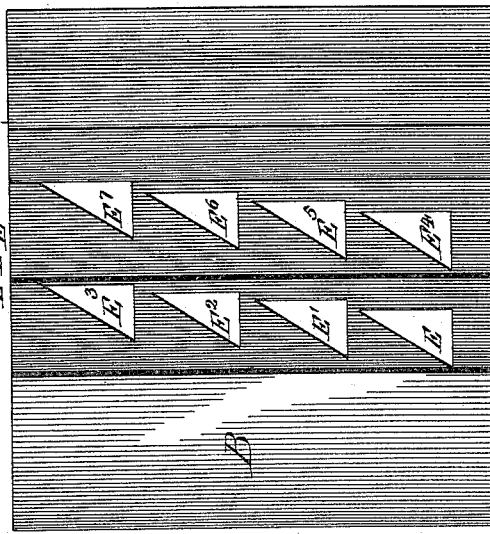
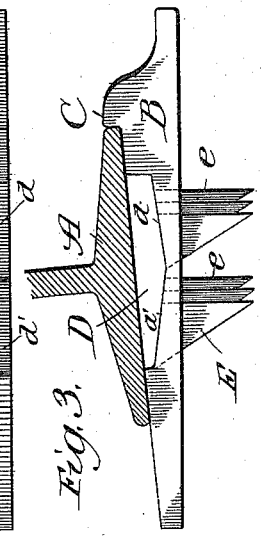
Witnesses:
Inventor:
Benjamin Wolhaupter
By Walter H. Chamberlin
Att'y

UNITED STATES PATENT OFFICE.

BENJAMIN WOLHAUPTER, OF CHICAGO, ILLINOIS.

RAILWAY-TIE PLATE.

SPECIFICATION forming part of Letters Patent No. 579,509, dated March 23, 1897.

Application filed October 19, 1896. Serial No. 609,378. (No model.)

*To all whom it may concern:*

Be it known that I, BENJAMIN WOLHAUPTER, a citizen of the United States, residing at Chicago, county of Cook, State of Illinois, have invented a certain new and useful Improvement in Railway-Tie Plates; and I declare the following to be a full, clear, and exact description of the invention, such as will enable others skilled in the art to which it pertains to make and use the same, reference being had to the accompanying drawings, which form a part of this specification.

My invention has for its object the production of a railway-tie plate which can be easily and cheaply manufactured and yet embody the essential characteristics of a perfect article.

The details of the construction will be hereinafter more fully described and claimed.

In the drawings, Figure 1 is an end elevation of a tie-plate and a portion of a rail embodying my invention. Fig. 2 is a plan view of the same. Fig. 3 is an end elevation illustrating a slight variation in the form. Fig. 4 is another end elevation illustrating still another slight variation. Fig. 5 is a plan view illustrating still another modification. Fig. 6 shows a variation wherein the depression is on the under side instead of the top side of the plate.

In carrying out the invention, A represents the rail, and B the plate. The plate may or may not be formed with a rail-abutting flange C, but I prefer to form it with such a flange. So, also, the rail-seat may be formed on an incline, as shown, or not, as desired. The important feature of the invention lies in forming the plate with a depression D in the upper face of the plate, underneath the rail. This depression may be of a variety of shapes in cross-section, but I will first describe the form shown in Fig. 1. I will first state that I preferably form the plate by rolling a continuous bar and then cutting it up into the requisite lengths to form the tie-plates. When the bar is rolled, it is formed with the rail-abutting flange C and the depression D of the form in cross-section desired. Preferably at the same time that the bar is cut into the desired lengths to form the plates the depending tie-engaging projections E to $E^7$ are formed by stamping out portions of the metal of the shape desired and turning them down for projections, as shown in Figs. 1 and 2. These projections may be of any shape desired and may be in any location and arranged as desired. I prefer to have them of triangular shapes, as shown in Fig. 1, eight in number, and arranged, as shown in Fig. 2, in pairs, each pair out of alinement with the adjacent pair. By this arrangement the plate can be easily shifted to restore the gage of track, all but one pair of projections always entering the orifices made by the projections before the plate is shifted. This adjustable feature of the plate is set forth more elaborately in previous patents and pending applications, and I will not further discuss this feature. It will be seen that the side or edge $e$ of each projection entering the tie forms the abutting edge for the projections against the wood composing the tie. In order that this edge may be the thickest, I shape the depression D as shown in Fig. 1, with the bottom of the depression having two inclined surfaces $d\ d'$. In Fig. 3 the depression D is somewhat different in cross-section, the two inclined surfaces being in opposite directions. In Fig. 4 I have not made the bottom of the depression inclined, but straight. In Fig. 5 I have altered the shape of the depending flanges, in this instance making three flanges F F' $F^2$ rectangular in cross-section. In Fig. 6 I have shown another variation in that the depression to form the thin metal from which to stamp the projections is made in the under side of the plate instead of the upper side of the plate. The result accomplished is obviously the same—that is, the thinning of the metal underneath the rail—so that without weakening the plate at the points where strength is required the projections can still be stamped from the metal. It will be observed that in each of these constructions the plate is rolled with the depression under the rail, where less metal is required, and the depending tie-engaging flanges stamped out of and turned down from this thin metal.

It will thus be seen that the plate can be originally rolled in bar form and then in the same operation can be cut into lengths and the tie-engaging flanges or projections formed thereon, thus making an extremely cheap plate, while at the same time it is effective for its work and strong enough to stand the pressure brought upon it.

What I claim is—

1. A railway-tie plate formed with a depression below the rail and one or more tie-engaging flanges or projections stamped out of and turned down from the thinner metal formed by reason of said depression, substantially as described.

2. A railway-tie plate formed with a depression below the rail, said plate having a rail-abutting flange on its upper side and one or more tie-engaging flanges on the under side turned down from the thinner metal formed by reason of the depression, substantially as described.

3. A railway-tie plate formed with a depression below the rail and one or more tie-engaging projections of triangular shape stamped from the thinner metal formed by reason of said depression, substantially as described.

4. A railway-tie plate formed with a depression below the rail said plate having a rail-abutting flange and a series of triangular-shaped depending projections stamped from the thinner metal formed by reason of said depression, substantially as described.

5. A railway-tie plate provided with a depression below the rail said plate having a rail-abutting flange and a series of triangular-shaped depending projections stamped from the thinner metal formed by reason of said depression, one projection being out of transverse alinement with the adjacent one, substantially as described.

6. A railway-tie plate formed with a depression below the rail said depression formed with one or more inclined surfaces and depending tie-engaging projections stamped from the thinner metal formed by reason of said depression, substantially as described.

7. A railway-tie plate formed with a depression below the rail said depression formed with one or more inclined surfaces and triangular-shaped depending tie-engaging projections stamped from the thinner metal formed by reason of said depression, substantially as described.

In testimony whereof I sign this specification in the presence of two witnesses.

BENJAMIN WOLHAUPTER.

Witnesses:
ESTHER W. ROTHELLE,
DE WITT W. CHAMBERLIN.